United States Patent [19]
Hubbard et al.

[11] 3,828,150
[45] Aug. 6, 1974

[54] WHEEL SPEED SENSOR FOR AN ANTI-SKID VEHICLE BRAKING SYSTEM

[75] Inventors: Harold C. Hubbard, Lansing, Mich.; Joseph J. Strbik, Tinley Park, Ill.

[73] Assignee: Motor Wheel Corporation, Lansing, Mich.

[22] Filed: Sept. 18, 1972

[21] Appl. No.: 289,946

Related U.S. Application Data
[63] Continuation of Ser. No. 210,761, Dec. 22, 1971, abandoned.

[52] U.S. Cl.......... 200/61.46, 188/181 R, 200/80 R
[51] Int. Cl............................................. B60t 8/12
[58] Field of Search........ 200/80 R, 61.46; 188/158, 188/180, 181 A, 181 C, 181 R; 137/49, 53, 102

[56] References Cited
UNITED STATES PATENTS
2,120,443  6/1938  Schoepf.......................... 188/181 R
3,630,347  12/1971  Davis.............................. 200/61.46

*Primary Examiner*—Herman J. Hohauser
*Attorney, Agent, or Firm*—Barnes, Kisselle, Raisch & Choate

[57] ABSTRACT

A wheel speed sensor for controlling an anti-skid vehicle braking system wherein the sensor is associated with a wheel hub mounted for rotation on a spindle. The sensor has a housing received on the hub with a switch pivotally mounted therein. One of the contacts of the switch is connected to an electrically conductive ring carried by the housing for rotation therewith and adapted to engage a brush assembly mounted in fixed relation to the spindle.

16 Claims, 3 Drawing Figures

INVENTORS
HAROLD C. HUBBARD
JOSEPH J. STRBIK

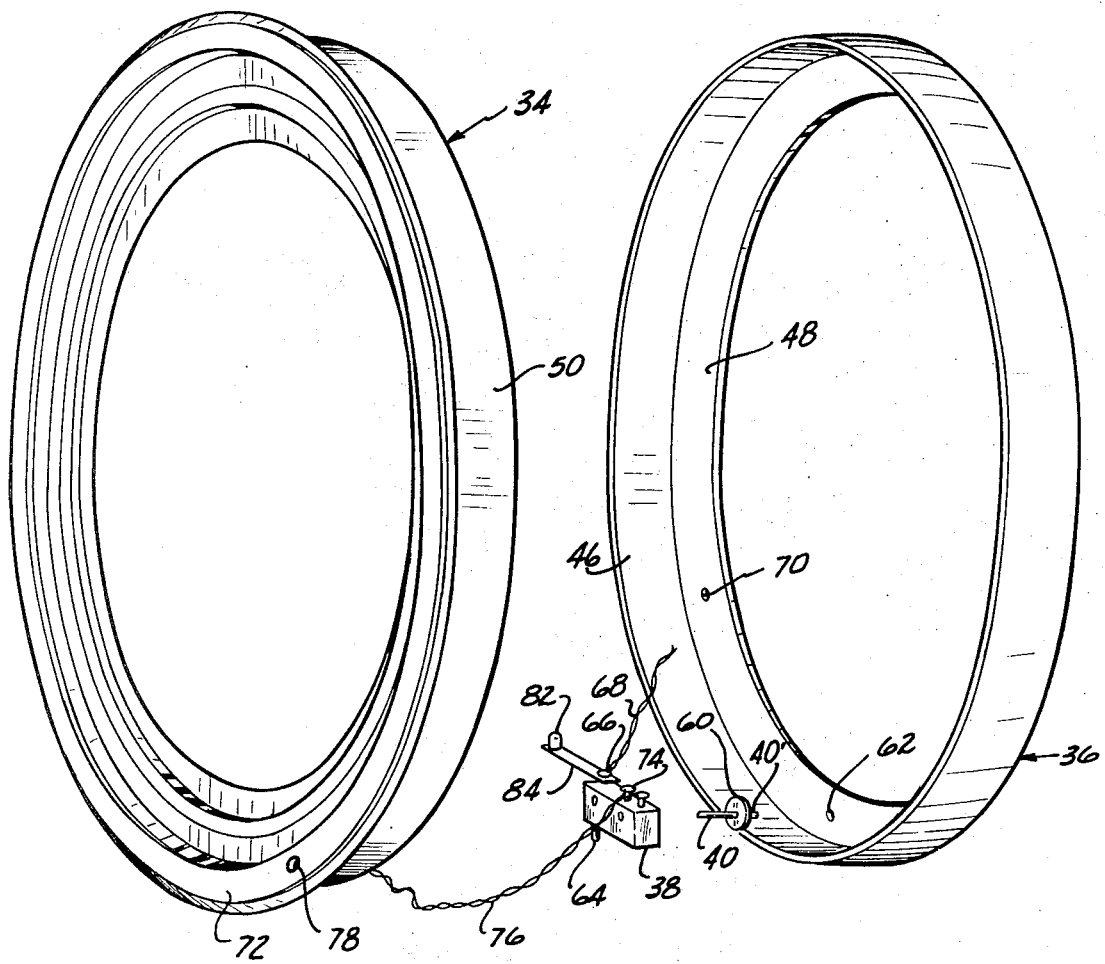
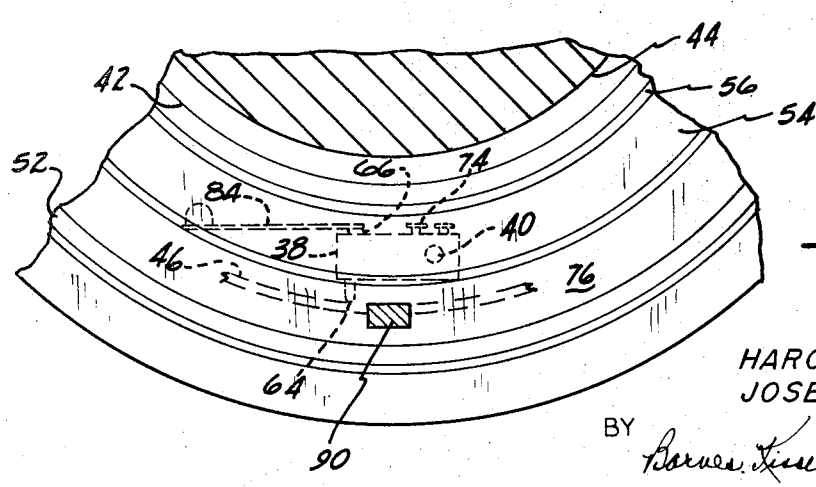

WHEEL SPEED SENSOR FOR AN ANTI-SKID VEHICLE BRAKING SYSTEM

REFERENCE TO A COPENDING APPLICATION

This is a continuation patent application of our copending patent application, Ser. No. 210,761, filed Dec. 22, 1971, entitled "Wheel Speed Sensor For An Anti-Skid Vehicle Braking System," now abandoned.

This invention relates to anti-skid vehicle braking systems and more particularly to a wheel speed sensor for such a system.

When a wheel of a vehicle traveling at a substantial speed is braked to such an extent that it approaches a skidding condition, the rotary speed of the wheel is sharply decreased in relation to the normal rotary speed of the braked wheel. Anti-skid vehicle braking systems are designed to interrupt or decrease the braking force applied to a vehicle wheel approaching a skidding condition so that the wheel can regain its normal rotary speed before the braking force is reapplied to thereby avoid skidding of the vehicle on which the wheel is mounted. One such anti-skid braking system is shown in Hubbard U.S. Pat. application Ser. No. 161,885, filed on July 12, 1971 as a continuation-in-part of copending application Ser. No. 97,431, filed Nov. 30, 1970, which continuation-in-part application may be referred to for a more detailed description of an anti-skid vehicle braking system and is incorporated herein by reference. In such an anti-skid braking system, it is necessary to have some device for sensing or determining when the braked vehicle wheel is approaching a skidding condition so that the anti-skid system can release or decrease the braking force on the wheel.

Objects of this invention are to provide a vehicle wheel speed sensor for an anti-skid braking system which can be readily installed on the wheel and hub assembly of a vehicle previously produced without an anti-skid braking system, can be readily removed for inspection and replacement, is of economical construction and assembly, and is substantially maintenance and service free.

These and other objects, features and advantages of this invention will be apparent from the following detailed description, appended claims, and accompanying drawings in which:

FIG. 2 is an exploded perspective view of some of the component parts of the sensor of FIG. 1.

FIG. 3 is a fragmentary vertical sectional view on line 3—3 of FIG. 1.

Figure 1:
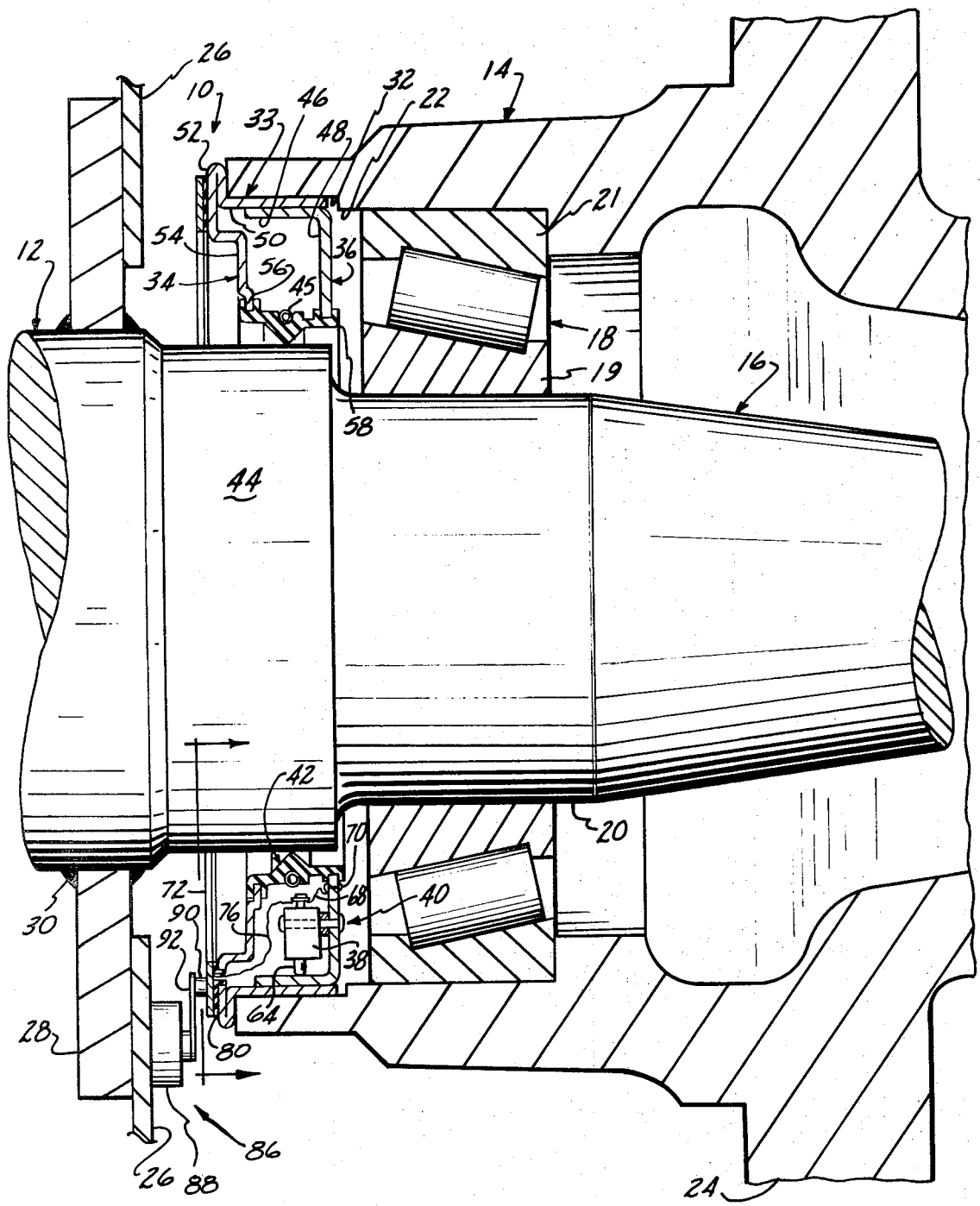
FIG. 1 is a fragmentary vertical sectional view taken along the axis of a speed sensor embodying this invention mounted on an axle and hub assembly of a towed vehicle such as a semi-trailer.

Referring in more detail to the drawings, FIG. 1 illustrates an exemplary but preferred embodiment of an anti-skid sensor 10 of the present invention disposed in rotary sealing engagement with conventional axle 12 and mounted on a wheel hub 14 of a semi-trailer (not shown). Hub 14 is mounted for rotation on a nonrotary spindle 16 of axle 12 by an inboard roller bearing 18 and an outboard roller bearing (not shown). The stationary inner race 19 of bearing 18 encircles and is secured to a cylindrical surface 20 of spindle 16 and the outer race 21 is secured in a counterbore 22 of hub 14 for rotation therewith. Hub 14 has a mounting flange 24 to which a wheel rim (not shown) and a brake drum (not shown) are secured against the outboard and inboard faces thereof respectively. A brake drum dust cover 26 is fixed to a back-up ring 28 secured to axle 12 by welds 30. Sensor 10 is frictionally received in a standard counterbore 32 of the hub which is conventionally used to receive and retain a grease seal.

Sensor 10 has a two-part annular housing 33 comprising telescopically interengaged inboard and outboard members 34 and 36 respectively which are preferably sheet metal stampings. A miniature switch 38, which may be that sold commercially under the trademark "Microswitch," is pivotally mounted by a pin 40 in the sealed hollow interior housing 33, housing 33 being closed at its inner periphery by a resilient grease seal 42 urged into sealing engagement with a cylindrical surface 44 of spindle 16 by a tension coil spring 45 which has its ends threaded into each other to provide a continuous ring. Outboard housing member 36 is generally L-shaped in axial cross section with a cylindrical side wall portion 46 and a radially inwardly extending end wall portion 48. Similarly, inboard housing member 34 has a cylindrical side wall portion 50 and three axially offset generally radially extending end wall portions 52, 54, and 56, portion 52 being a folded section of larger diameter than wall 50 to provide a reinforced abutment flange adapted to engage the inboard end of hub 14 (FIG. 1). Grease seal 42 has two axially spaced circumferential grooves 58 and 58' which firmly frictionally engage the inner edges of end wall portions 48 and 56 respectively to carry seal 42 on housing 33 for rotation therewith.

As shown in FIGS. 1 and 2, in assembling sensor 10 one end 40' of pin 40 is inserted into a hole 62 in housing member 36 until an integral spacer disc 60 of pin 40 abuts the interior surface of wall 48 and then the protruding tip of end 40' is flattened into a rivet head to fix pin 40 to housing member 36. Switch 38 has a through-hole adjacent one end thereof which receives the other end 40" of pin 40 and then the protruding tip of end 40" is also flattened to retain switch 38 on pin 40 and thereby pivotally mount the switch on housing member 36. Switch 38 has an actuator plunger 64 yieldably biased so as to protrude generally radially outwardly from the end of the switch remote from pin 40, the free end of plunger 64 thus being disposed to bear on side wall 46 (FIGS. 1 and 3). Switch 38 has at least one set of contacts which are actuated to open and closed states by axial or endwise movement of plunger 64 to first and second spaced positions respectively. One of the contacts of switch 38 is electrically connected to the ground side of the vehicle through a binding post 66 and a lead wire 68 connected at one end to post 66 and silver soldered at its other end to housing member 36 in an aperture 70 therein. The other contact of switch 38 is electrically connected to a commutator ring 72 of housing 33, made of an electrically conductive material such as aluminum through a binding post 74 and a lead wire 76 connected at one end to post 74 and silver soldered at its other end to ring 72 at 78. As shown in FIG. 1, ring 72 is adhesively mounted on an electrically insulating washer 80, made of a material such as "Bakelite" plastic, washer 80 in turn being adhered to the outer surface of side wall portion 52 of housing member 34.

A flyweight 82 (FIGS. 2 and 3) is fixed to the free end of a rigid lever arm 84 which is fixed at its other end to binding post 66 of switch 38. Arm 84 extends generally radially outwardly relative to the pivot axis of switch 38 and tangentially within the hollow interior of housing 33, the free end of the arm terminating short of wall 46 to allow freedom of movement of flyweight 82 within the limited range of pivotal movement of switch 38 permitted by movement of plunger 64 between its aforementioned spaced position. Weight 82 and lever arm 84 do not form any part of the electrical circuit of switch 38, arm 84 merely being fixed to binding post 66 because it offers a convenient attachment point.

After switch 38 is connected via lead lines 68 and 76 as described above, housing members 34 and 36 are telescoped together and secured to one another as by spot welding side walls 46 and 50 to provide the annular housing 33, and then grease seal 42 is assembled to complete the housing. To provide an electrical connection between the rotary sensor 10 and stationary axle 12, a brush assembly 86 is mounted on brake drum dust plate 26. Brush assembly 86 has a base 88, made of an electrically insulative material such as "Bakelite" plastic, secured to plate 26 and a brush 90 yieldably urged into engagement with ring 72 (FIGS. 1 and 3) by a spring arm 92 secured at one end to base 88 and carrying brush 90 on its free end.

In operation, sensor 10 is mounted on an axle, hub, and wheel assembly of a vehicle in the same manner as the conventional grease seal which it replaces, sensor housing 33 and switch 38 thus rotating with hub 14 and the associated road wheel. Rotation of hub 14 due to the movement of the vehicle creates a centrifugal force acting on flyweight 82 which tends to pivot switch 38 counterclockwise as viewed in FIG. 3, causing plunger 64 to butt against wall 46. Rotation of the hub faster than a predetermined comparatively low rotary speed produces sufficient centrifugal force to overcome the spring bias holding plunger 64 extended, whereupon the free end of the switch pivots further counterclockwise about pin 40 as plunger 64 is pushed inwardly with respect to the switch against its spring bias until the plunger actuates its associated contacts from a first to a second state. Whenever the rotary speed of the hub decreases below the predetermined comparatively low speed, the spring bias exerted on plunger 64 overcomes the decreased centrifugal force and urges the plunger outwardly of the switch, thereby causing the contacts to revert to their first state. When the contacts are in their first state, they complete an electrical circuit through the ground side of the vehicle and brush assembly 86 to produce a signal or condition indicating that the hub is rotating at a speed less than the predetermined wheel speed. The predetermined low speed at which the contacts revert to the first state can be varied by varying the mass of weight 82, or the length of lever arm 84, or both. An anti-skid braking system in which speed sensor 10 is used may have appropriate circuitry to compare the wheel speed signal from sensor 10 with the speed of the vehicle to indicate and/or control the application of the vehicle brakes so as to avoid a skidding condition. In the aforementioned co-pending application Ser. No. 161,885, circuitry is disclosed wherein sensor 10 may be used to sense wheel speed and release the brakes whenever the speed of the wheel being sensed drops below the predetermined speed, such circuitry also operating to override the signal provided by the contacts of switch 38 reverting to their first state when the vehicle speed is low enough to cause all wheels to drop below the predetermined low speed so that under this condition maximum braking force can be applied to the wheel mounted on hub 14. While this blocking out of the brake release signal renders the anti-skid braking system inoperative, anti-skid braking below this low speed is neither necessary nor desirable.

In the speed sensor of this invention, the use of a grease seal housing 33 which is received in the standard bore of a hub normally used to retain a conventional grease seal provides a device which can be readily installed on the hub of a vehicle originally manufactured without an anti-skid braking system. The frictionally mounting of housing 33 also facilitates rapid removal for inspection and replacement of the speed sensor. The use of stamp sheet metal housing members 34 and 36, the grease seal 42 frictionally received on the housing members, and a standard switch 38 provides a speed sensor which is of economical construction and easy to assemble. Moreover, the pivotally mounting of a standard switch within the protected confines of a grease seal casing provides a speed sensor of comparatively few movable component parts which is essentially service and maintenance free.

We claim:

1. An anti-skid vehicle braking system speed sensor for a wheel mounted on a hub for rotation relative to the vehicle, comprising; a housing adapted to be mounted on the hub for rotation therewith, a switch having a body with at least one set of contacts therein and a yieldably biased actuator carried by said body and movable to first and second positions to actuate said one set of contacts to open and closed states, said body being pivotally mounted in said housing at a point spaced from said actuator such that said actuator is moved from one of said positions to the other of said positions by pivotal movement of said body in relation to said housing in response to a change in the centrifugal force acting on said switch caused by a given change in the rotary speed of the hub and wheel.

2. The speed sensor of claim 1 in which said actuator comprises an arm extending generally radially of the hub with its free end adapted to bear on a surface of said housing radially outboard of said free end of said actuator arm.

3. The speed sensor of claim 1 in which said housing is adapted to be received and retained in a standard bore in the hub normally provided to receive a grease seal.

4. The speed sensor of claim 1 wherein the hub is mounted on a spindle for rotation and said housing includes a resilient seal adapted to engage a generally circular surface of the spindle to provide a grease seal between the spindle and the hub.

5. The speed sensor of claim 1 wherein the hub is mounted on a spindle for rotation and said housing includes a ring of an electrically conductive material mounted externally on said housing and adapted to encircle and be generally coaxial with the spindle, said ring of an electrically conductive material being electrically connected with one of said contacts of said switch.

6. The speed sensor of claim 5 which also comprises an electrically conductive brush adapted to be mounted in fixed relation to the spindle and in continuous electrical contact with said ring of an electrically conductive material carried by said housing.

7. The speed sensor of claim 1 in which said switch has a lever arm fixed adjacent one end to said body and a weight fixed to the free end of said arm, said arm extending generally radially outwardly from the pivotal axis of said body within the confines of said housing.

8. The speed sensor of claim 1 wherein the hub is mounted on a spindle for rotation and in which said housing comprises first and second circular members having generally axially extending cylindrical side walls adapted for telescoping engagement with each other and generally radially extending end walls being axially spaced in assembly, and a generally circular seal engaging and being carried by said axially spaced end walls, said seal being adapted to engage a circular surface of the spindle to provide a grease seal between the spindle and the hub, with said housing and said seal totally enclosing said switch.

9. The speed sensor of claim 8 wherein said end walls of said members each have an inner peripheral edge juxtaposed in axially spaced relation with one another, and said seal comprises a resilient elastomeric band having a pair of external grooves individually frictionally receiving said inner edges of said members to thereby retain said seal on said housing and provide a closure for the inner periphery of said housing.

10. The speed sensor of claim 8 in which said switch is pivotally mounted in said housing by a pin fixed to one of said outer walls of one of said members.

11. The speed sensor of claim 1 in which said switch comprises a commercially available miniature switch.

12. An anti-skid vehicle braking system speed sensor for a wheel mounted on a hub mounted for rotation on a spindle with the hub having a bore therein concentric with the axis of the spindle and normally used to retain a conventional grease seal comprising, a housing having a generally cylindrical side wall portion adapted to be frictionally received in said bore in said hub for rotation therewith, a centrifugally actuated switch having at least one set of contacts, said switch being mounted in said housing such that centrifugal force acting on said switch caused by a change in the rotary speed of the hub and wheel from a predetermined speed will change the electrical state of said one set of contacts, and a resilient seal carried by said housing and adapted to engage a generally circular surface of the spindle to provide a grease seal between the spindle and the hub.

13. The speed sensor of claim 12 in which said switch comprises a commercially available miniature switch.

14. The speed sensor of claim 12 wherein said housing and said resilient seal totally enclose said switch.

15. The speed sensor of claim 12 which also comprises a ring of an electrically conductive material mounted externally on said housing and adapted to encircle and be generally coaxial with the spindle, said ring of an electrically conductive material being electrically connected with one of said contacts of said switch.

16. The speed sensor of claim 12 in which said housing comprises first and second circular members having generally axially extending cylindrical side walls adapted for telescoping engagement with each other and generally radially extending end walls being axially spaced in assembly, said resilient seal being carried by said axially spaced end walls with said resilient seal and said housing totally enclosing said switch.

* * * * *